United States Patent
Nakayama et al.

(10) Patent No.: US 8,709,144 B2
(45) Date of Patent: Apr. 29, 2014

(54) PRECURSOR SOL OF ALUMINUM OXIDE AND METHOD FOR PRODUCING OPTICAL MEMBER

(75) Inventors: Tomonari Nakayama, Yokohama (JP); Kenji Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1036 days.

(21) Appl. No.: 12/748,926

(22) Filed: Mar. 29, 2010

(65) Prior Publication Data
US 2010/0247758 A1 Sep. 30, 2010

(30) Foreign Application Priority Data

Mar. 31, 2009 (JP) ................................. 2009-087241

(51) Int. Cl.
*C09D 1/00* (2006.01)
*C09D 5/00* (2006.01)
*G02B 1/11* (2006.01)
*B05D 5/02* (2006.01)

(52) U.S. Cl.
CPC .. *C09D 1/00* (2013.01); *C09D 5/00* (2013.01); *G02B 1/113* (2013.01); *G02B 1/118* (2013.01); *B05D 5/02* (2013.01)
USPC ...... 106/287.17; 427/164; 427/165; 427/226; 427/343

(58) Field of Classification Search
CPC .......... C09D 1/00; G02B 1/118; G02B 1/113; B05D 5/02
USPC .................................... 106/287.17
See application file for complete search history.

(56) References Cited

U.S. PATENT DOCUMENTS

| 4,013,465 A | 3/1977 | Clapham |
| 4,579,594 A * | 4/1986 | Nanao et al. ............. 106/287.24 |
| 7,922,994 B2 * | 4/2011 | Yotou et al. ................ 423/592.1 |
| 8,580,026 B2 * | 11/2013 | Makino et al. ........... 106/287.17 |
| 2009/0162274 A1 | 6/2009 | Yotou et al. |
| 2013/0177759 A1 * | 7/2013 | Fang et al. .................... 428/329 |
| 2013/0220178 A1 * | 8/2013 | Zieba et al. ............. 106/287.17 |

FOREIGN PATENT DOCUMENTS

| DE | 4116523 A1 | 11/1991 |
| EP | 1693689 A1 | 8/2006 |
| JP | 9-202649 A | 8/1997 |

OTHER PUBLICATIONS

XP00376948, "A modified powder route for the preparation of sol-gel process-synthesized magnesia and alumina", M. T., Tsai, et al., 6053A Journal of Materials Science Letter, 12(Jul. 1, 1993), No. 13, pp. 1025-1027.

(Continued)

*Primary Examiner* — David M Brunsman
(74) *Attorney, Agent, or Firm* — Canon U.S.A., Inc., IP Division

(57) ABSTRACT

A precursor sol of aluminum oxide includes a solvent and particles containing a hydrolysate of an aluminum compound and/or a condensate of the hydrolysate, in which the particles have an average particle size of 2.5 nm to 7 nm. A method for producing an optical member includes the steps of feeding the precursor sol of aluminum oxide described above onto a base to form an aluminum oxide film and immersing the aluminum oxide film in hot water with a temperature of 60° C. to 100° C. to form a textured structure comprising aluminum oxide boehmite.

5 Claims, 11 Drawing Sheets

(56) References Cited

OTHER PUBLICATIONS

XP00584309, "Influence of Peptization on the Properties of Alumina Produced from Boehmite Sols", R.I. Zakharchenya, 6181 Journal of Sol-Gel Science and Technology 6(1996) No. 2, Dordrecht, NL, pp. 179-186.

R.I. Zakharchenya, "Influence of Peptization on the Properties of Alumina Produced from Boehmite Sols", Journal of Sol-Gel Science and Technology 6, 179-186 (1996), XP00584309.
M.T. Tsai, et al, A modified powder route for the preparation of sol-gel process-synthesized magnesia and alumina, Letters 12 (Jul. 1, 1993), 1025-1027, Journal of Materials Science Letters, London GB, XP00376948.

* cited by examiner

PRECURSOR SOL OF ALUMINUM OXIDE AND METHOD FOR PRODUCING OPTICAL MEMBER

BACKGROUND OF THE INVENTION

1. Field of the Invention

The present invention relates to a precursor sol of aluminum oxide and a method for producing an antireflective optical member with the precursor sol of aluminum oxide. In particular, the present invention relates to a method for producing an optical member configured to stably deliver high antireflection performance in a wide wavelength range including the visible region.

2. Description of the Related Art

Antireflective structures with periodic microstructures which has repetition periods each equal to or lower than a wavelength in the visible region and which has appropriate pitches and heights are known to deliver excellent antireflection performance in a wide wavelength.

An example of a known method for forming a periodic microstructure is coating in which a film including fine particles dispersed therein is formed by coating, the fine particles each having a particle size equal to or lower than a wavelength in the visible region. U.S. Pat. No. 4,013,465 discloses that a method for forming a periodic microstructure by patterning with micromachining equipment, e.g., an electron beam lithography system, a laser interference exposure apparatus, a semiconductor exposure apparatus, or an etching apparatus, enables us to control the pitch and height of the periodic microstructure and to form a periodic microstructure having excellent antireflection performance.

It is known that as another method, boehmite, which is aluminum oxide hydroxide, is grown on a base to provide an antireflection effect. For example, Japanese Patent Laid-Open No. 9-202649 discloses that an aluminum (aluminum oxide) film formed by a liquid-phase method (sol-gel method) is subjected to steam treatment or hot-water immersion treatment to modify its surface into a boehmite surface having a periodic microstructure, thereby affording an antireflection coating.

It is known that in the method for forming an antireflection coating with a periodic microstructure composed of boehmite, the resulting film has extremely low reflectivity at normal incidence and high antireflection performance. However, a constant height and a constant period of the periodic microstructure are required to maintain the high antireflection performance. In the case of forming a periodic microstructure by the vacuum film formation method, it is difficult to control the thickness of a film formed on a curved surface or a wide surface. Meanwhile, in the case of employing the method in which an aluminum oxide film is formed by a liquid-phase method (sol-gel method) and then subjected to hot-water immersion treatment, a periodic microstructure can be formed on a surface having any shape. However, a precursor sol of aluminum oxide prepared by hydrolysis of an aluminum compound is not always stable as a coating material. It is thus difficult to form an antireflection coating with uniform reflectivity by uniformly applying the precursor sol to a base and then performing the hot-water treatment.

In the liquid-phase method (sol-gel method) in which an antireflection coating is formed with the precursor sol of aluminum oxide, it is desirable to provide a precursor sol of aluminum oxide, the precursor sol being stable as a coating material without causing aggregation, and a simple method for producing a high-performance uniform antireflection coating with the aluminum-oxide-precursor sol.

SUMMARY OF THE INVENTION

According to one aspect of the invention, a precursor sol of aluminum oxide includes a solvent and particles each containing a hydrolysate of an aluminum compound and/or a condensate of the hydrolysate, in which the particles have an average particle size of 2.5 nm to 7 nm.

Further features of the present invention will become apparent from the following description of exemplary embodiments with reference to the attached drawings.

DESCRIPTION OF THE EMBODIMENTS

Figure 1:
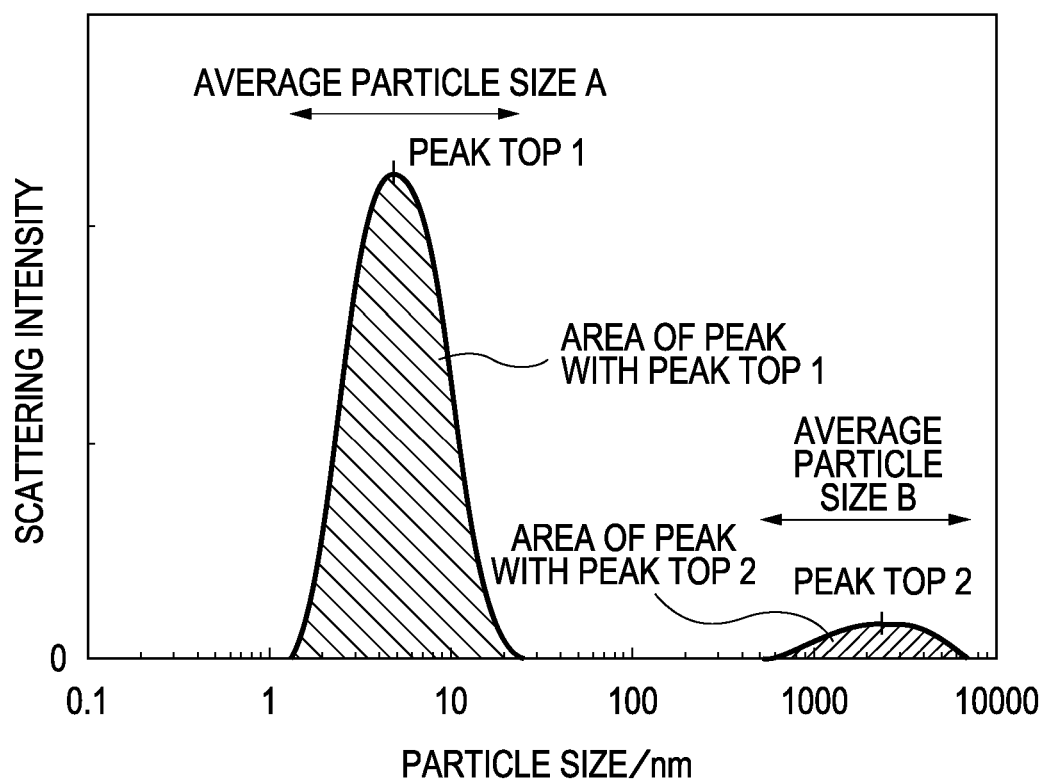
FIG. 1 is a particle size distribution curve of particles contained in a precursor sol of aluminum oxide according to an embodiment of the present invention.

Embodiments of the present invention will be described in detail below. Aspects of the present invention provide a precursor sol of aluminum oxide, the precursor sol having a relatively high stability for coating and having a relatively high antireflection performance, and a method for producing an optical member with relatively high antireflection performance and only fairly small variations in reflectivity.

A precursor sol of aluminum oxide according to aspects of the present invention includes a solvent and particles containing a hydrolysate of an aluminum compound and/or a condensate of the hydrolysate, in which the particles have an average particle size of 2.5 nm to 7 nm.

The precursor sol of aluminum oxide according to the present invention may be suitably used in a method for producing an optical member according to aspects of the present invention described below because the precursor sol of aluminum oxide may be applied on a base, dried, and immersed in hot water to form a textured structure comprising aluminum oxide boehmite.

The precursor sol of aluminum oxide according to aspects of the present invention mainly contains a hydrolysate and/or a condensate of the hydrolysate prepared by bringing an aluminum compound into contact with water in a solvent. Let the aluminum compound be Al—$X_3$ (X represents an alkoxy group, an acyloxy group, a halogen group, or a nitrate ion), the hydrolysate of the aluminum compound is expressed as Al—$X_2$(OH), Al—X(OH)$_2$, or Al—(OH)$_3$. A reaction between hydroxy groups or between the —X group and the —OH group of the hydrolysate gives an Al—O—Al bond and is accompanied by the elimination of $H_2O$ or XH. The resulting compound having one or more Al—O—Al bonds and having a linear or branched structure is defined as a condensate of the aluminum compound. According to one aspect the particles are amorphous.

The condensate may be present in the form of a gel and/or particles. Thus, in the case where the precursor sol of aluminum oxide is measured by dynamic light scattering, a particle size distribution curve is obtained from scattered light intensity. Furthermore, the average particle size can be determined from peaks in the particle size distribution curve. The proportion of particles having a size equal to the average particle size can be determined from the areas of the peaks.

The average particle size of the particles determined from the peaks in the particle size distribution curve of the precursor sol of aluminum oxide according to the present invention is in the range of 2.5 nm to 7 nm. The precursor sol of aluminum oxide with a particle size in the above range may have excellent coatability on a base and can provide a film with a highly uniform thickness.

The particle size distribution curve of the precursor sol of aluminum oxide according to one aspect of the present invention includes at least one peak having a single peak top, in which the at least one peak has an average particle size of 2.5 nm to 7 nm, and the area of the peak having an average particle size of 2.5 nm to 7 nm is 90% or more, such as 98% or more of the total peak area of the particle size distribution curve.

FIG. 1 is a particle size distribution curve of particles contained in a precursor sol of aluminum oxide according to an embodiment of the present invention. In the particle size distribution curve in FIG. 1, the particle size is plotted on the horizontal axis on a logarithmic scale, and the scattering intensity is plotted on the vertical axis. This particle size distribution curve has two peaks: a peak with a peak top 1 and a peak with a peak top 2. A represents the average particle size of particles within the peak with the peak top 1. B represents the average particle size of particles within the peak with the peak top 2. The particles in the precursor sol of aluminum oxide according to aspects of the present invention that are within the peak with the peak top 1 have an average particle size A of 2.5 nm to 7 nm. Furthermore, the proportion of the area of the peak with the peak top 1 may be 90% or more of the sum of the areas of the peak with the peak top 1 and the peak with the peak top 2, i.e., the total area of the particle size distribution curve.

The condensate of the hydrolysate of the aluminum compound is observed as the peak with the single peak top 1. The contact between the condensate and water yields a trace amount of insoluble matter as a by-product. A broad peak extending from several hundreds of nanometers to several tens of micrometers seems to be derived from the insoluble matter and is observed as the peak with the peak top 2.

The condensate in the precursor sol of aluminum oxide is in the form of microgels during the initial stage of growth. The microgels grow into particles. The particles have a size of about 2 nm at the initial stage of morphological changes from gels to particles. A large increase in particle size does not occur. The gels are not easily aggregated as the morphological changes from gels to particles proceed, thus reducing the viscosity of the precursor sol of aluminum oxide. After the completion of the changes from sols to particles, the particle size begins to increase, and the viscosity of the precursor sol of aluminum oxide is minimized. A particle size of about 2.5 nm results in the minimization of the viscosity. A further increase in particle size results in an increase in the viscosity of the precursor sol of aluminum oxide. At a particle size exceeding 7 nm, the particle size increases rapidly, thus facilitating aggregation. That is, the particles having an average particle size of 2.5 nm to 7 nm are in a state between a state in which the condensate in the precursor sol of aluminum oxide grows to some extent into particles that do not easily aggregate and a state in which the further growth of the particles facilitates aggregation.

In the case where an aluminum oxide film is formed with the precursor sol of aluminum oxide according to the present invention and subjected to hot-water treatment, it is possible to produce an antireflection coating having excellent antireflection properties compared with the case where a precursor sol of aluminum oxide, the precursor sol having a proportion of particles with an average size of less than 2.5 nm of 90% or more, is used. Furthermore, the particles having an average particle size of less than 2.5 nm do not grow sufficiently, so that large amounts of gel-like materials and by-products suspended are present in the precursor sol of aluminum oxide. In particular, particles forming a broad peak, which is derived from the by-products, extending from several hundreds of nanometers to several tens of micrometers remains after filtration with a membrane filter. Such a precursor sol of aluminum oxide is unstable and thus may not be preferred as a coating solution. Meanwhile, particles having an average size exceeding 7 nm have a large interparticle cohesive force, so that nonaggregated particles and aggregated particles are present. A high proportion of aggregated particles leads to clogging of a filter during filtration. Even at a low proportion of aggregated particles, a precursor sol of aluminum oxide has a high viscosity. Aggregation proceeds between coating and drying to the touch, causing a rapid increase in viscosity.

In the case where a precursor sol of aluminum oxide contains large amounts of by-products and aggregates and thus the proportion of the area of the foregoing broad peak, derived from the by-products, extending from several hundreds of nanometers to several tens of micrometers is 10% or more, when a aluminum oxide film is formed and subjected to hot-water treatment, the resulting film does not have a uniform reflectivity, in some cases.

A precursor sol of aluminum oxide may contain a small amount of at least one metal compound selected from compounds of Zr, Si, Ti, Zn, and Mg, together with an aluminum compound. Examples of the metal compounds that can be used include metal alkoxides and metal salts, such as metal chlorides and metal nitrates. In particular, a metal alkoxide may be used because, for example, a by-product formed in preparing a sol has only a minor effect on coatability. Furthermore, the proportion of the aluminum compound may be 90 mole percent or more with respect to 100 mole percent of the total amount of the metal compounds.

The proportion of the particles containing the hydrolysate of the aluminum compound and/or the condensate of the hydrolysate in the precursor sol of aluminum oxide according to the present invention may be in the range of 1% by weight to 7% by weight, such as 2.5% by weight to 6% by weight on a metal oxide basis.

Specific examples of the metal oxide such as the aluminum compound are described below.

Examples of the aluminum compound include aluminum ethoxide, aluminum isopropoxide, aluminum n-butoxide, aluminum sec-butoxide, aluminum tert-butoxide, aluminum acetylacetonate, oligomers thereof, aluminum nitrate, aluminum chloride, aluminum acetate, aluminum phosphate, aluminum sulfate, and aluminum hydroxide.

Examples of a zirconium alkoxide include zirconium tetramethoxide, zirconium tetraethoxide, zirconium tetra-n-propoxide, zirconium tetraisopropoxide, zirconium tetra-n-butoxide, and zirconium tetra-tert-butoxide.

Various silicon alkoxides represented by a general formula $Si(OR)_4$ may be used, wherein the R's are the same or different, with each representing a lower alkyl group, e.g., a methyl group, an ethyl group, a propyl group, an isopropyl group, a butyl group, or an isobutyl group.

Examples of a titanium alkoxide include tetramethoxytitanium, tetraethoxytitanium, tetra-n-propoxytitanium, tetraisopropoxytitanium, tetra-n-butoxytitanium, and tetraisobutoxytitanium.

Examples of a zinc compound include zinc acetate, zinc chloride, zinc nitrate, zinc stearate, zinc oleate, and zinc salicylate. In particular, zinc acetate and zinc chloride may be provided.

Examples of a magnesium compound include magnesium alkoxide, such as dimethoxymagnesium, diethoxymagnesium, dipropoxymagnesium, and dibutoxymagnesium; magnesium acetylacetonate; and magnesium chloride.

Among these metal compounds, the metal alkoxides, such as aluminum n-butoxide, aluminum sec-butoxide, zirconium tetraisopropoxide, zirconium tetra-n-butoxide, tetramethoxysilane, tetraethoxysilane, tetraisopropoxytitanium, tetra-n-butoxytitanium, dipropoxymagnesium, and dibutoxymagnesium, may be used as raw materials.

Among these metal compounds, in particular, the alkoxides of aluminum, zirconium, and titanium are highly reactive with water and are rapidly hydrolyzed by water in air or by the addition of water to form a white turbidity and precipitates. Furthermore, it is difficult to dissolve aluminum salt compounds, zinc salt compounds, and magnesium salt compounds in an organic solvent alone, so that the resulting solution has low stability. To prevent these problems from occurring, a stabilizer may be added to increase the stability of the solutions.

Examples of the stabilizer include β-diketone compounds, such as acetylacetone, dipivaloylmethane, trifluoroacetylacetone, hexafluoroacetylacetone, benzoylacetone, and dibenzoylmethane; β-ketoesters, such as methyl acetoacetate, ethyl acetoacetate, allyl acetoacetate, benzyl acetoacetate, isopropyl acetoacetate, tert-butyl acetoacetate, isobutyl acetoacetate, 2-methoxyethyl acetoacetate, and methyl 3-keto-n-valerate; and alkanolamines, such as monoethanolamine, diethanolamine, and triethanolamine.

The amount of the stabilizer added varies depending on the type of metal compound and may be in the range of 0.2 mol to 2 mol with respect to 1 mol of an aluminum alkoxide. The effect of the stabilizer is exerted by mixing the stabilizer with the alkoxide for a predetermined period of time before the addition of water.

To cause hydrolysis, an appropriate amount of water is required to be added. The appropriate amount of water added varies depending on the solvent and concentration. The amount of water added may be 1.2 mol or more and less than 2 mol with respect to 1 mol of the aluminum compound.

For the purpose of partially promoting a hydrolysis reaction, a catalyst may be added to water. Hydrochloric acid, phosphoric acid, or the like may be used as the catalyst in a concentration of 0.1 mol/L or less.

An organic solvent may be used as the solvent so long as raw materials such as the aluminum compound are uniformly dissolved in the organic solvent without causing the aggregation of the particles. Examples of the organic solvent include monohydric alcohols, such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; di- or higher-hydric alcohols, such as ethylene glycol and triethylene glycol; glycol ethers, such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers, such as dimethoxyethane, diglyme, tetrahydrofuran, dioxane, diisopropyl ether, and cyclopentyl methyl ether; esters, such as ethyl formate, ethyl acetate, n-butyl acetate, ethylene glycol monomethyl ether acetate, ethylene glycol monoethyl ether acetate, ethylene glycol mono-n-butyl ether acetate, and propylene glycol monomethyl ether acetate; aliphatic and alicyclic hydrocarbons, such as n-hexane, n-octane, cyclohexane, cyclopentane, and cyclooctane; aromatic hydrocarbons, such as toluene, xylene, and ethylbenzene; ketones, such as acetone, methyl ethyl ketone, methyl isobutyl ketone, and cyclohexanone; chlorinated hydrocarbons, such as chloroform, methylene chloride, carbon tetrachloride, and tetrachloroethane; and aprotic polar solvents, such as N-methylpyrrolidone, N,N-dimethylformamide, N,N-dimethylacetamide, and ethylene carbonate.

Among these solvents, a monohydric alcohol having 5 to 8 carbon atoms may be provided because of its low hygroscopicity and a high solubility of the aluminum compound therein. The progression of the hydrolysis of the aluminum compound due to the moisture absorption of the solvent makes the control of the particle size difficult. Furthermore, moisture absorption during coating leads to the aggregation of the particles, thereby deteriorating the stability of optical properties. In the case of using a common alcohol with a low boiling point, the solvent evaporates rapidly. Thus, the foregoing stabilizer remains in the resulting film, affecting the optical properties. In the case of using a monohydric alcohol having 5 to 8 carbon atoms, the solvent is evaporated together with the stabilizer during drying and/or firing, so that the stabilizer is almost removed. Meanwhile, the monohydric alcohol having 5 to 8 carbon atoms is highly hydrophobic; hence, water required for hydrolysis is not uniformly mixed in the alcohol, which makes the formation of a constant particle size difficult. Thus, the monohydric alcohol having 5 to 8 carbon atoms may be used in combination with a water-miscible solvent. The term "water-miscible solvent" described here is used to indicate a solvent having a miscibility with water of 80% by weight or more at 23° C.

The precursor sol of aluminum oxide according to aspects of the present invention may have a solvent content of 50% by weight to 98% by weight, such as 60% by weight to 93% by weight.

Regarding the mixing ratio of the solvents, the proportion of the monohydric alcohol having 5 to 8 carbon atoms may be in the range of 50% by weight to 90% by weight, and the proportion of the water-miscible solvent having a boiling point of 110° C. to 170° C. may be in the range of 10% by weight to 50% by weight. The water-miscible solvent is a water-miscible solvent having a boiling point of 110° C. to 170° C. The use of a water-miscible solvent having a boiling point of less than 110° C. is liable to cause whitening and moisture absorption due to evaporation. In the case of using a water-miscible solvent having a boiling point exceeding 170° C., the water-miscible solvent remains in the resulting aluminum oxide film even after drying, thereby leading to variations in reflectivity. The water-miscible solvent may be glycol ether.

In the case of preparing the precursor sol of aluminum oxide according to aspects of the present invention, heating may be performed to promote the hydrolysis and the condensation reaction of the aluminum alkoxide. The heating temperature varies depending on the boiling point of the solvent and may be in the range of 60° C. to 150° C. The heating allows the particles to grow, improving particle properties.

A method for producing an optical member according to the present invention will be described in detail below.

The method for producing an optical member according to the present invention includes the steps of:

(1) feeding the precursor sol of aluminum oxide described above onto at least one surface of a base, (2) spreading the precursor sol of aluminum oxide on the base, (3) drying and/or firing the base to form an aluminum oxide film, and (4) immersing the aluminum oxide film in hot water with a temperature of 60° C. to 100° C. to form a textured structure comprising aluminum oxide boehmite.

According to one aspect of the invention, the method includes, in sequence, the steps (1) to (4), and in the step of feeding the precursor sol of aluminum oxide, the above-described precursor sol of aluminum oxide is used.

The optical member may include an antireflection coating formed of a plate-crystal layer comprising plate crystals containing aluminum oxide boehmite on at least one surface of a base.

FIGS. 2A to 2D are process drawings illustrating a method for producing an optical member according to an embodiment of the present invention.

Figure 2A:
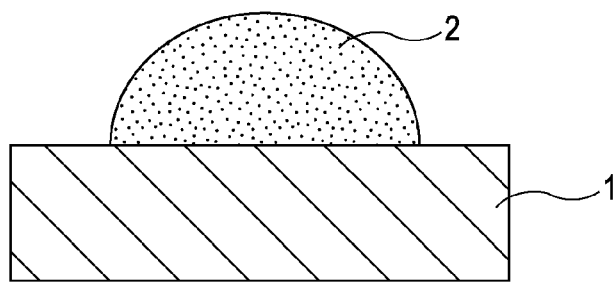
FIGS. 2A to 2D are process drawings illustrating a method for producing an optical member according to an embodiment of the present invention.

FIG. 2A shows a state in which the precursor sol 2 of aluminum oxide is fed onto a base 1 in the step (1). Examples of a method for feeding the precursor sol 2 of aluminum oxide include a method in which the precursor sol 2 of aluminum oxide is dropped through a narrow tube or one or more small openings; a method in which the precursor sol 2 of aluminum oxide is attached to the base 1 through a slit; and a method in which the precursor sol 2 of aluminum oxide is temporarily attached to a plate and then transferred to the base 1. Alternatively, the base 1 is immersed in the precursor sol 2 of aluminum oxide to feed the base 1 with precursor sol 2 of aluminum oxide.

The precursor sol 2 of aluminum oxide may be filtered before feeding the precursor sol 2 of aluminum oxide onto the base 1. The filtration is performed with a membrane filter having a pore size of 1 μm or less to remove foreign matter and large particles present in an amount of several percent. Examples of a filtration method include suction filtration, pressure filtration, and recirculation filtration in which a liquid is repeatedly passed through a filter. Alternatively, in the above-described method in which the precursor sol 2 of aluminum oxide is fed through the narrow tube, a filter may be arranged in the middle of the narrow tube, so that the sol may be fed while being filtered.

Figure 2B:
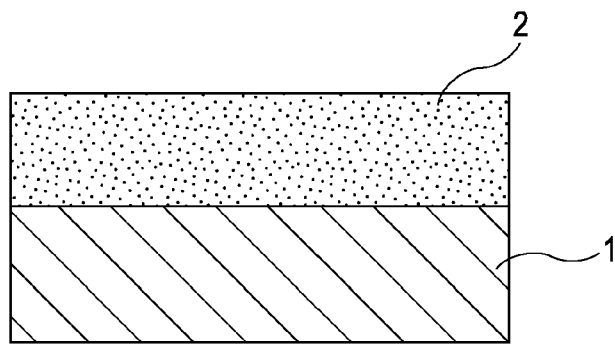

FIG. 2B shows a state in which the precursor sol 2 of aluminum oxide fed in the step (1) is spread on the base 1 in the step (2). Examples of a method for spreading the precursor sol 2 of aluminum oxide on the base 1 include spin coating in which the dropped sol 2 is spread by rotating the base 1; and blade coating and roll coating in which the sol 2 dropped on the base 1 is spread by moving a blade and a roll. Alternatively, the precursor sol 2 of aluminum oxide can be spread while being fed. Examples thereof include slit coating in which the precursor sol 2 of aluminum oxide is spread by moving a slit or the base 1 while the precursor sol 2 of aluminum oxide is being fed through the slit; and printing in which the sol 2 temporarily attached to a plate is transferred by moving the base 1.

A further example thereof is dip coating in which the base 1 is immersed in the precursor sol 2 of aluminum oxide and then drawn at a fixed speed. In the case of producing an optical member having a three-dimensionally complex shape, such as a concave shape, it is difficult to bring a feeder of the precursor sol 2 of aluminum oxide near to the member; hence, spin coating may be employed.

Figure 2C:
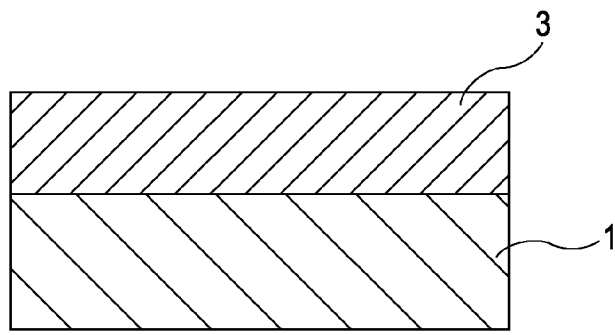

FIG. 2C shows a state in which the base 1 is dried and/or fired to form an aluminum oxide film 3 in the step (3). When the base 1 is dried by heating, the solvent in the precursor sol 2 of aluminum oxide that has been spread on the base 1 in the step (2) is evaporated, so that the particles in the sol 2 are deposited to form the aluminum oxide film 3. Further heating the resulting film volatilizes the stabilizer and promotes the condensation reaction of unreacted alkoxide and hydroxyl groups. The heating temperature may be 150° C. or higher, which is a temperature that may be required to volatilize the stabilizer, and 300° C. or lower in view of the effect on the base and other members. Examples of a heating method include a method for heating the base in a circulating hot air oven, a muffle furnace, or an induction heating (IH) furnace; and a method for heating the base with an infrared (IR) lamp.

Figure 2D:
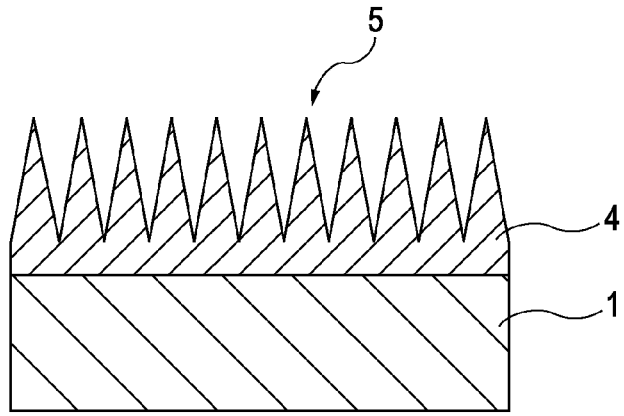

FIG. 2D shows a state in which a layer 4 having a textured structure 5 comprising aluminum oxide boehmite on the base 1 is formed in the step (4). The textured structure 5 is formed by bringing the aluminum oxide film 3 formed in the step (3) into contact with hot water with a temperature of 60° C. to 100° C. The layer 4 having the textured structure comprises crystals of at least one of oxide, hydroxide, and its hydrate of aluminum. The layer 4 comprises mainly boehmite. Examples of a method for bringing the aluminum oxide film 3 into contact with hot water include a method in which the base 1 is immersed in hot water; and a method in which the aluminum oxide film 3 is brought into contact with running hot water or atomized hot water.

The layer 4 having the textured structure 5 comprising aluminum oxide boehmite may be a plate-crystal layer comprising plate crystals mainly containing aluminum oxide boehmite. In this case, a schematic cross-sectional view of an optical member according to this embodiment is shown in FIG. 3.

Figure 3:
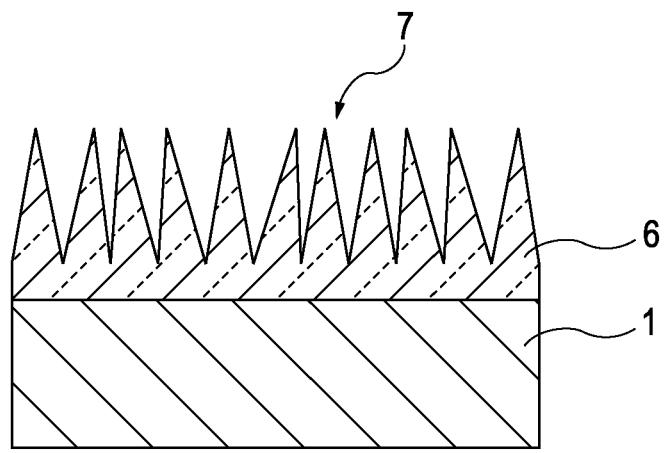
FIG. 3 is a schematic view of an optical member according to an embodiment of the present invention.

In FIG. 3, the optical member produced by the production method of the present invention includes a plate-crystal layer 6 comprising plate crystals mainly containing aluminum oxide boehmite stacked on the base 1. The plate-crystal layer 6 mainly containing aluminum oxide boehmite is formed of crystals of at least one of oxide, hydroxide, and its hydrate of aluminum, the crystals comprising mainly boehmite. The plate-crystal layer 6 has a textured structure comprising aluminum oxide boehmite, the textured structure being made by applying a precursor sol of aluminum oxide according to the present invention onto a base, heating the sol to form an aluminum oxide film, and bringing the aluminum oxide film into contact with hot water. In the plate-crystal layer 6, each of the plate crystals may comprise an amorphous aluminum oxide at the lower portion (bottom) thereof.

Furthermore, the ends of the plate crystals form a fine textured shape 7. To increase the height of fine projections and reduce intervals of the projections, the plate crystals may be selectively arranged at a specific angle to the surface of the base.

Figure 4:
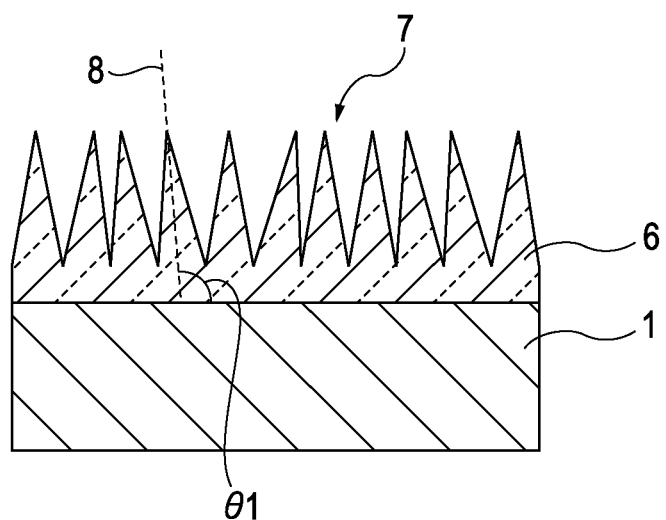
FIG. 4 is a schematic view of an optical member according to an embodiment of the present invention.

In the case where the surface of the base 1 is flat like a surface of a flat plate, a film, a sheet, or the like, the plate crystals may be arranged in such a manner that the average angle of angles θ1 defined by inclination directions 8 of the plate crystals and the surface of the base is in the range of 45° to 90° such as 60° to 90° as shown in FIG. 4.

Figure 5:
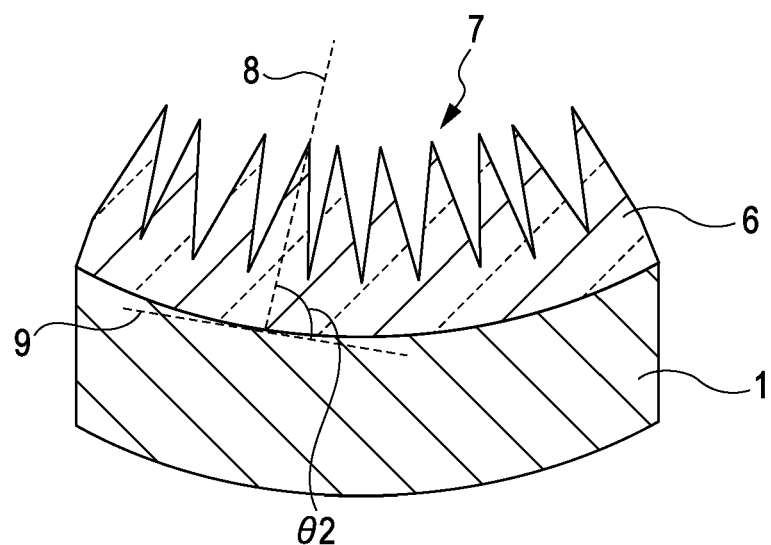
FIG. 5 is a schematic view of an optical member according to an embodiment of the present invention.

In the case where the surface of the base 1 is two- or three-dimensionally curved, as shown in FIG. 5, the plate crystals may be arranged in such a manner that the average angle of angles θ2 defined by inclination directions 8 of the plate crystals and a tangent 9 to the surface of the base is in the range of 45° to 90° such as 60° to 90°.

The plate-crystal layer 6 may have a thickness of 20 nm to 1000 nm, such as 50 nm to 1000 nm. In the case where the layer constituting the textured shape has a thickness of 20 nm to 1000 nm, the fine textured structure provides effective antireflection performance. Furthermore, the mechanical strength of the textured structure is not reduced, thus advantageously reducing the production cost of the fine textured structure. A thickness of the layer of 50 nm to 1000 nm results in a further increase in antireflection performance and thus may be provided.

The surface density of the fine textured structure according to the present invention may also be important. The mean surface roughness Ra', which corresponds to the surface density and is defined by extending the arithmetical mean deviation to a surface, may be 5 nm or more, such as 10 nm or more, and even 15 nm to 100 nm. Furthermore, the surface area ratio Sr may be 1.1 or more, such as 1.15 or more, and even 1.2 to 3.5.

An example of a method for evaluating the resulting fine textured structure is the observation of a surface of the fine textured structure with a scanning probe microscope. The observation shows that the mean surface roughness Ra' defined by extending the arithmetical mean deviation Ra to a plane and the surface area ratio Sr are determined. That is, the mean surface roughness Ra' (nm) is defined by applying and three-dimensionally extending the arithmetical mean deviation Ra, which is defined by JIS B0601, to a measuring surface. The mean surface roughness Ra' is expressed as "the mean value of absolute values of deviations from a reference plane to a specified plane" and represented by the following expression (1):

$$Ra' = \frac{1}{S_0} \int_{Y_B}^{Y_T} \int_{X_L}^{X_R} |F(X, Y) - Z_0| dx\, dy \quad (1)$$

where
Ra': a mean surface roughness (nm),
$S_0$: an area when the measuring surface is assumed to be ideally flat,
F(X, Y): a height at a measurement point (X, Y), X represents an X-coordinate, and Y represents a Y-coordinate,
$X_L$ to $X_R$: the range of the X-coordinates in the measuring surface,
$Y_B$, to $Y_T$: the range of the Y-coordinates in the measuring surface, and
$Z_0$: a mean height in the measuring surface.

The surface area ratio Sr is determined from the expression: $Sr=S/S_0$ (where $S_0$ represents the area when the measuring surface is assumed to be ideally flat; and S represents the actual surface area of the measuring surface). Note that the actual surface area of the measuring surface is determined as follows: First, the surface is divided into small triangles realized by connecting nearest-neighbor three data points (A, B, C) by line segments. Then the area ΔS of each of the small triangles is determined by the vector product: ΔS (ΔABC)= [s(s−AB)(s−BC)(s−AC)]0.5 (where AB, BC, and AC are the lengths of the sides, and s≡0.5(AB+BC+AC)). The actual surface area S is determined as the sum of ΔS. Regarding the surface density of the fine textured structure, in the case where Ra' is 5 nm or more and where Sr is 1.1 or more, the textured structure provides the antireflection effect. In the case where Ra' is 10 nm or more and where Sr is 1.15 or more, the antireflection effect is higher than that described above. In the case where Ra' is 15 nm or more and where Sr is 1.2 or more, the antireflection effect reaches a practically usable level. In the case where Ra' is 100 nm or more and where Sr is 3.5 or more, however, a scattering effect resulting from the textured structure is stronger than the antireflection effect. Thus, sufficient antireflection performance cannot be provided.

Figure 6:
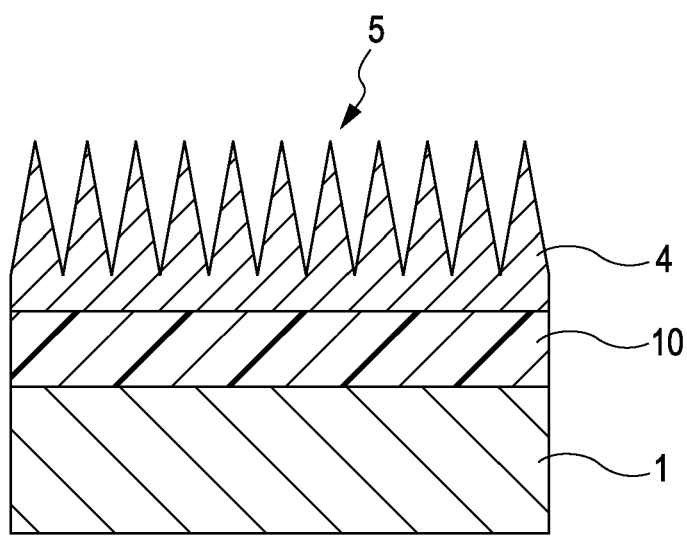
FIG. 6 is a schematic view of an optical member according to an embodiment of the present invention.

A layer comprising mainly a material other than aluminum oxide may be formed between the base 1 and the layer 4 having the textured structure 5 comprising aluminum oxide boehmite. FIG. 6 shows an example of an optical member in which a layer 10 comprising mainly a material other than aluminum oxide is stacked on the base 1 and in which the layer 4 having the textured structure 5 comprising aluminum oxide boehmite is stacked on the layer 10.

The layer 10 comprising mainly a material other than aluminum oxide is arranged in order to mainly adjust the difference in terms of refractive index between the base 1 and the layer 4 having the textured structure 5 comprising aluminum oxide boehmite. Thus, the layer 10 comprising mainly a material other than aluminum oxide may be formed of a transparent film comprising an inorganic material or an organic material.

Examples of an inorganic material that can be used for the layer 10 comprising mainly a material other than aluminum oxide include metal oxides, such as $SiO_2$, $TiO_2$, $ZrO_2$, ZnO, and $Ta_2O_5$. Examples of a method for forming the layer 10 comprising an inorganic material other than aluminum oxide include vacuum film formation method, such as evaporation and sputtering, and a sol-gel method in which a precursor sol of a metal oxide is applied.

Examples of an organic material that can be used for the layer 10 comprising mainly a material other than aluminum oxide include organic polymers, such as acrylic resins, epoxy resins, oxetane resins, maleimide resins, melamine resins, benzoguanamine resins, phenolic resins, resol resins, polycarbonate, polyester, polyarylate, polyether, polyurea, polyurethane, polyamide, polyamide-imide, polyimide, polyketone, polysulfone, polyphenylene, polyxylylene, and polycycloolefin. An example of a method for forming the layer 10 comprising mainly an organic material other than aluminum oxide is wet coating in which a solution containing the organic material is applied.

In addition, the textured structure 5 comprising aluminum oxide boehmite may be subjected to surface treatment to the extent that the antireflection performance is not impaired. To impart abrasion resistance and soil resistance, for example, a SiO$_2$ thin film or an extremely thin layer comprising a fluorinated alkylsilane (FAS) or fluorocarbon resin may be formed.

EXAMPLES

Example 1

While the present invention will be described in detail below by examples, the present invention is not limited to these examples. Optical films having surfaces with fine textured structures formed in examples and comparative examples were evaluated by methods described below.

(1) Preparation of Precursor Sol 1 to 7 of Aluminum Oxide

First, 17.2 g of aluminum sec-butoxide (ASBD, manufactured by Kawaken Fine Chemicals Co., Ltd.), 4.56 g of 3-oxobutanoic acid ethyl ester, and 4-methyl-2-pentanol were mixed and stirred to form a uniform solution. After 0.01 M dilute hydrochloric acid was dissolved in a 4-methyl-2-pentanol/1-ethoxy-2-propanol mixed solvent, the resulting solution was slowly added to the aluminum sec-butoxide solution. The mixture was stirred for some time. The solvent was adjusted to finally obtain the mixed solvent of 53 g of 4-methyl-2-pentanol and 23 g of 1-ethoxy-2-propanol. The mixture was further stirred in an oil bath with a temperature of 120° C. for 2 to 3 hours or more, thereby preparing a precursor sol of aluminum oxide. The amounts of 0.01 M dilute hydrochloric acid added were changed stepwise from 0.88 g to 2.02 g to prepare precursor sols 1 to 7 of aluminum oxide.

(2) Preparation of Precursor Sol 8 to 11 of Aluminum Oxide

First, 24.6 g of aluminum sec-butoxide (ASBD, manufactured by Kawaken Fine Chemicals Co., Ltd.), 6.51 g of 3-oxobutanoic acid ethyl ester, and 1-pentanol were mixed. The mixture displayed a white turbidity at first and stirred to form uniform solution. After 0.01 M dilute hydrochloric acid was dissolved in a 1-pentanol/1-ethoxy-2-propanol mixed solvent, the resulting solution was slowly added to the aluminum sec-butoxide solution. The mixture was stirred for some time. The solvent was adjusted to finally obtain the mixed solvent of 49 g of 1-pentanol and 21 g of 1-ethoxy-2-propanol. The mixture was further stirred in an oil bath with a temperature of 120° C. for 2 to 3 hours or more, thereby preparing a precursor sol of aluminum oxide. Thereby, precursor sols 8 to 11 of aluminum oxide were prepared, the sols containing different amounts, i.e., 1.8 g, 2.25 g, 2.7 g, and 3.06 g, of 0.01 M dilute hydrochloric acid.

(3) Preparation of Precursor Sol 12 of Aluminum Oxide

First, 17.2 g of aluminum sec-butoxide (ASBD, manufactured by Kawaken Fine Chemicals Co., Ltd.), 4.56 g of 3-oxobutanoic acid ethyl ester, and 2-propanol were mixed and stirred to form a uniform solution. After 1.26 g of 0.01 M dilute hydrochloric acid was dissolved in 2-propanol, the resulting solution was slowly added to the aluminum sec-butoxide solution. The mixture was stirred for some time. The solvent was adjusted to finally obtain 76 g of 2-propanol. The mixture was refluxed in an oil bath for 2 to 3 hours or more to give a precursor sol 12 of aluminum oxide.

(4) Viscosity Measurement

Viscosity was measured at 50 rpm and 25° C. with a coneplate rotational viscometer (RE-105L, manufactured by Toki Sangyo Co., Ltd.) equipped with a standard rotor (1°34', R24).

(5) Measurement of Particle Size Distribution

About 1 mL of a precursor sol of aluminum oxide was charged into a glass cell, and the particle size distribution was measured with a particle size distribution analyzer (Zetasizer Nano S, manufactured by Malvern Instruments Ltd.) at 25° C. Analysis was performed under the conditions: the refractive index was set to 1.5, the absorption was set to 0.01, and the viscosity of the sol was set to a value measured as described above.

(6) Rinse of Base

A circular glass substrate, in which only one surface was polished and the other surface was ground-glass-like surface was frosted, having a diameter of about 30 mm and a thickness of about 1 mm was subjected to ultrasonic cleaning in an alkaline cleaning solution and then dried in an oven.

(7) Measurement of Reflectivity

Reflectivity measurement was performed in the wavelength range of 400 nm to 700 nm at an incident angle of 0° with an absolute reflectivity measurement system (USPM-RU, manufactured by Olympus Corporation).

(8) Observation of Substrate Surface

After a surface of a substrate was subjected to Pd/Pt treatment, the surface was observed with an FE-SEM (S-4800, manufactured by Hitachi High-Technologies Corporation) at an acceleration voltage of 2 kV.

Examples 1 to 4

Figure 7:
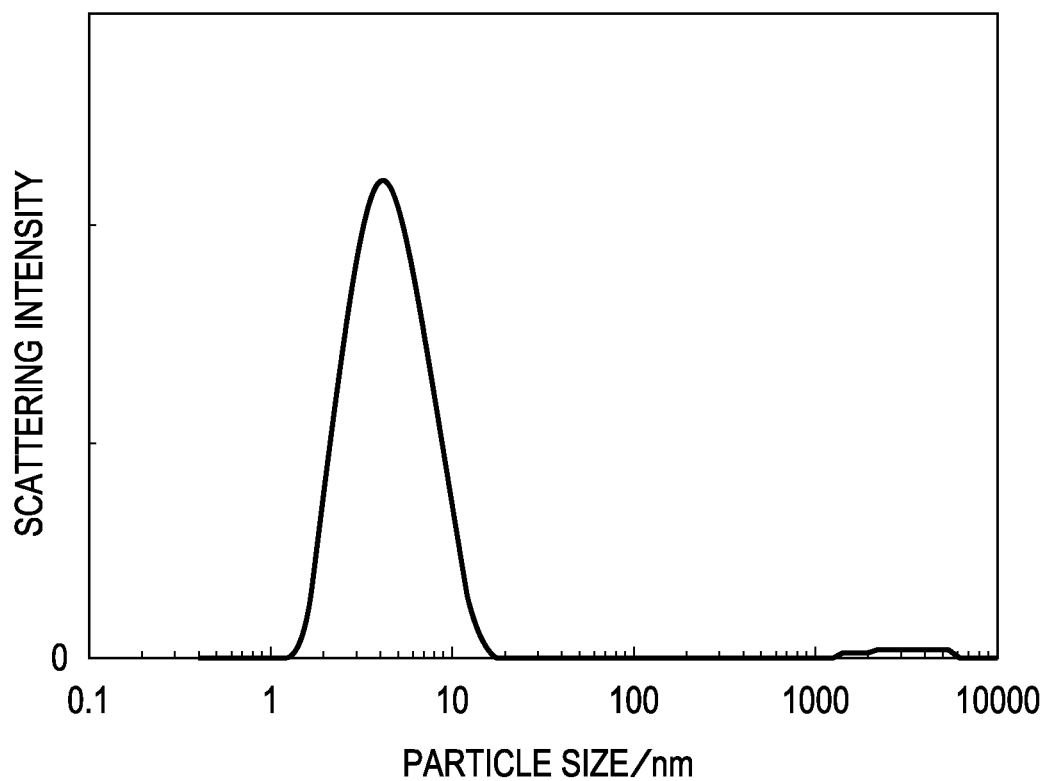
FIG. 7 is a particle size distribution curve of a precursor sol 5 of aluminum oxide in Example 3.
Figure 10:
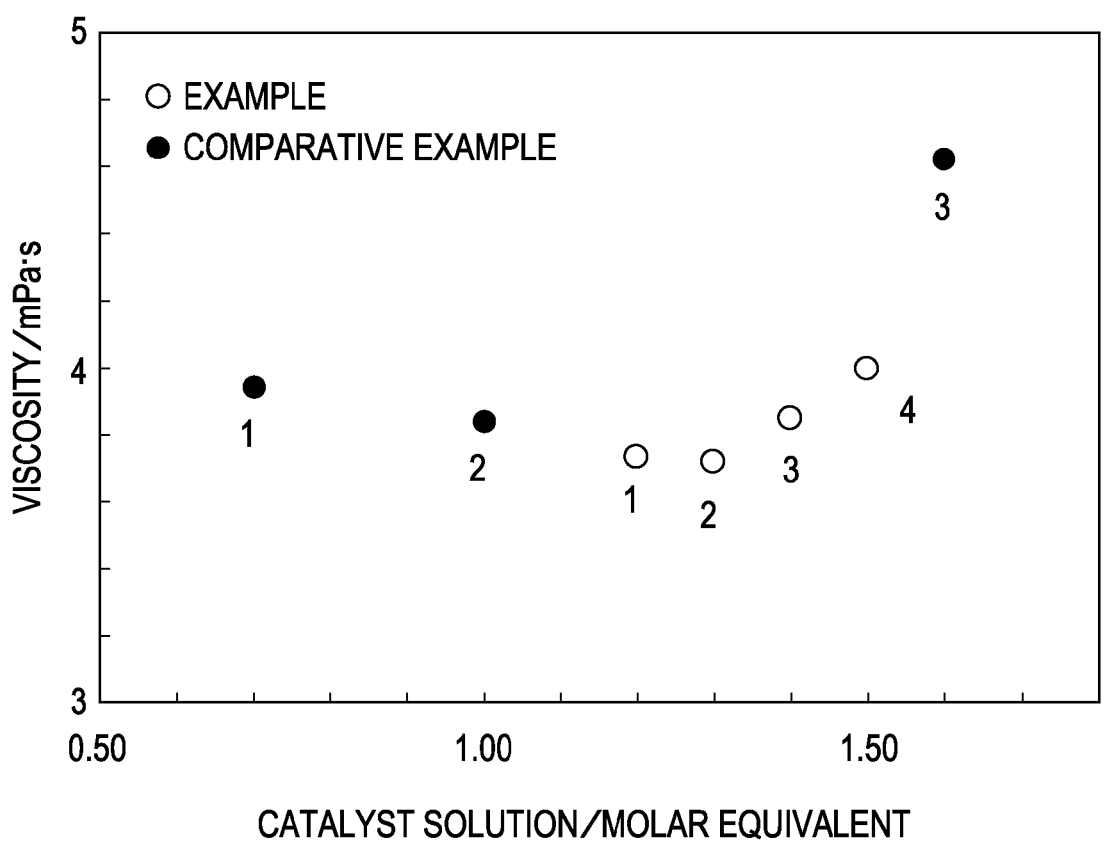
FIG. 10 is a graph showing the relationship between the amount of a catalyst solution and the viscosity of precursor sols 1 to 7 of aluminum oxide in Examples 1 to 4 and Comparative Examples 1 to 3.
Figure 11:
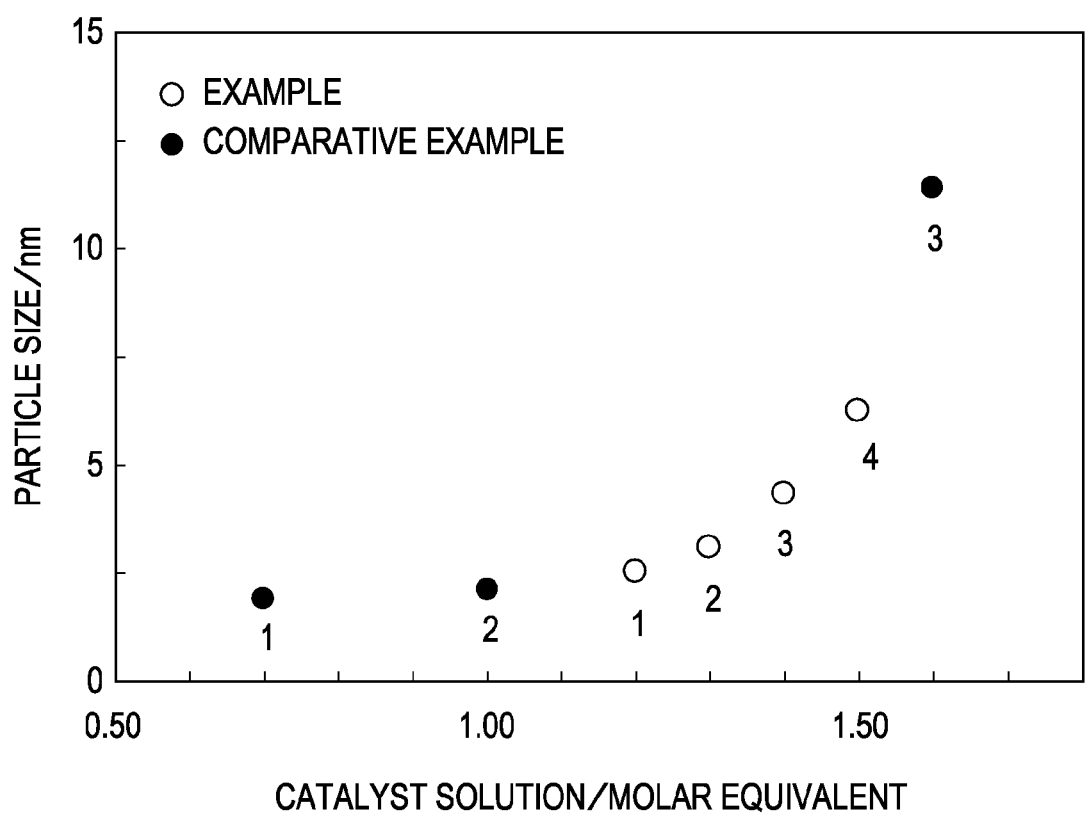
FIG. 11 is a graph showing the relationship between the amount of a catalyst solution and the average particle size of precursor sols 1 to 7 of aluminum oxide in Examples 1 to 4 and Comparative Examples 1 to 3.
Figure 12:
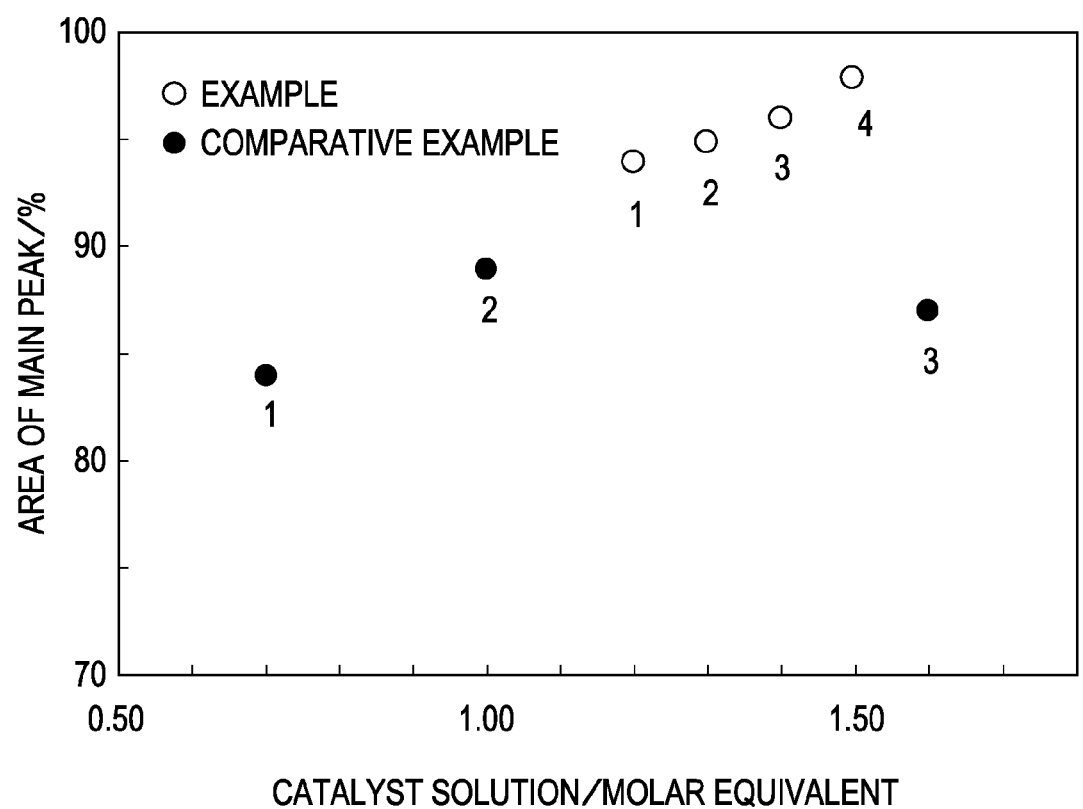
FIG. 12 is a graph showing the relationship between the amount of a catalyst solution and the area of a main peak of precursor sols 1 to 7 of aluminum oxide in Examples 1 to 4 and Comparative Examples 1 to 3.

The precursor sols 3 to 6 of aluminum oxide were subjected to viscosity measurement and particle size distribution measurement. Table 1 shows the results. FIG. 7 shows a particle size distribution curve of the precursor sol 5 of aluminum oxide in Example 3. FIGS. 10 to 12 are graphs showing the dependence of the viscosity, the average particle sizes of main peaks, and the percentages of areas of the main peaks on the molar equivalent of a catalyst solution (0.01 M dilute hydrochloric acid) with respect to aluminum sec-butoxide.

Example 5

An appropriate amount of the precursor sol 3 of aluminum oxide was dropped on a polished surface of a rinsed glass substrate (with a diameter of 30 mm) comprising mainly La$_2$O$_5$ and having an nd of 1.77 and a vd of 50. Spin coating was performed at 3500 rpm for 20 seconds. Nonuniformity resulting from the spin coating was not observed. The film was fired at 200° C. in a circulating hot air oven for 120 minutes, thereby forming an amorphous aluminum oxide film on the glass substrate.

Next, the aluminum oxide film was immersed in hot water with a temperature of 80° C. for 30 minutes and then dried at 60° C. for 15 minutes.

An FE-SEM observation of a surface of the resulting film showed a fine textured structure in which plate crystals comprising mainly aluminum oxide were arranged randomly and complicatedly.

Reflectivities at one central portion and two peripheral portions were measured. Differences in reflectivity were checked at a wavelength of 600 nm to determine whether uniform reflectivity was obtained or not. The results demonstrated that the difference in reflectivity was less than 0.1%, which showed only small variations in antireflection performance.

Example 6

The same operation was performed as in Example 5, except that the precursor sol 4 of aluminum oxide was used in place of the sol 3.

The results demonstrated that nonuniformity due to the spin coating was not observed and that the difference in reflectivity after the immersion of the substrate in hot water was less than 0.1%, which showed only small variations in antireflection performance.

Example 7

The same operation was performed as in Example 5, except that the precursor sol 5 of aluminum oxide was used in place of the sol 3.

The results demonstrated that nonuniformity due to the spin coating was not observed and that the difference in reflectivity after the immersion of the substrate in hot water was less than 0.1%, which showed only small variations in antireflection performance.

Example 8

The same operation was performed as in Example 5, except that the precursor sol 6 of aluminum oxide was used in place of the sol 3.

The results demonstrated that nonuniformity due to the spin coating was not observed and that the difference in reflectivity after the immersion of the substrate in hot water was less than 0.1%, which showed only small variations in antireflection performance.

Example 9

An appropriate amount of the precursor sol 10 of aluminum oxide (with an average particle size of 3.5 nm and a peak area of 93%) was dropped on a polished surface of a rinsed glass substrate (with a diameter of 30 mm) comprising mainly $La_2O_5$ and having an nd of 1.77 and a vd of 50. Spin coating was performed at 3000 rpm for 20 seconds. The resulting film was fired at 200° C. in a circulating hot air oven for 120 minutes, thereby forming an amorphous aluminum oxide film on the glass substrate.

Next, the aluminum oxide film was immersed in hot water with a temperature of 80° C. for 30 minutes and then dried at 60° C. for 15 minutes.

An FE-SEM observation of a surface of the resulting film showed a fine textured structure in which plate crystals comprising mainly aluminum oxide were arranged randomly and complicatedly.

Figure 13:
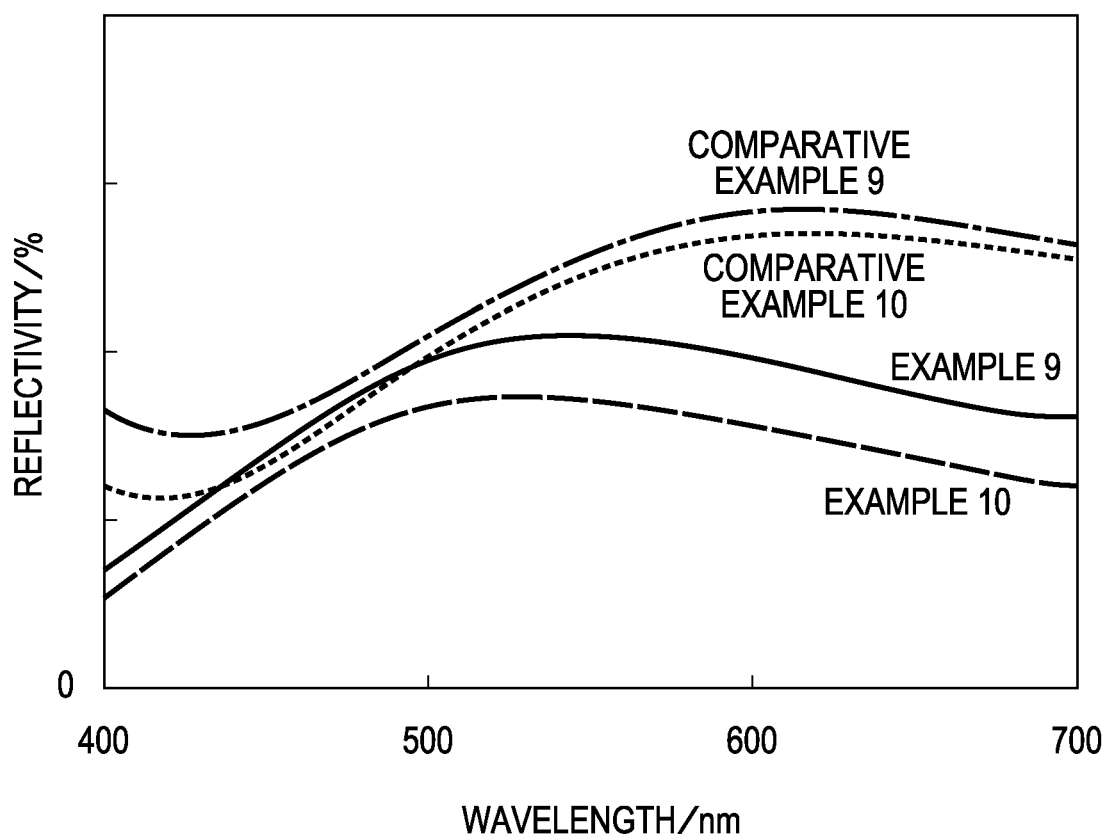
FIG. 13 is a graph showing the relationship between the absolute reflectivity and the wavelength ranging from 400 to 700 nm of optical members in Examples 9 and 10 and Comparative Examples 9 and 10.

FIG. 13 shows the results of the measurement of reflectivity. The results demonstrated that an increase in particle size reduced the reflectivity.

Example 10

The same operation was performed as in Example 9, except that the precursor sol 11 of aluminum oxide (with an average particle size of 6.8 nm and a peak area of 96%) was used in place of the precursor sol 10 of aluminum oxide.

FIG. 13 shows the results of the measurement of reflectivity. The results demonstrated that an increase in particle size reduced the reflectivity.

Comparative Examples 1 to 4

Figure 8:
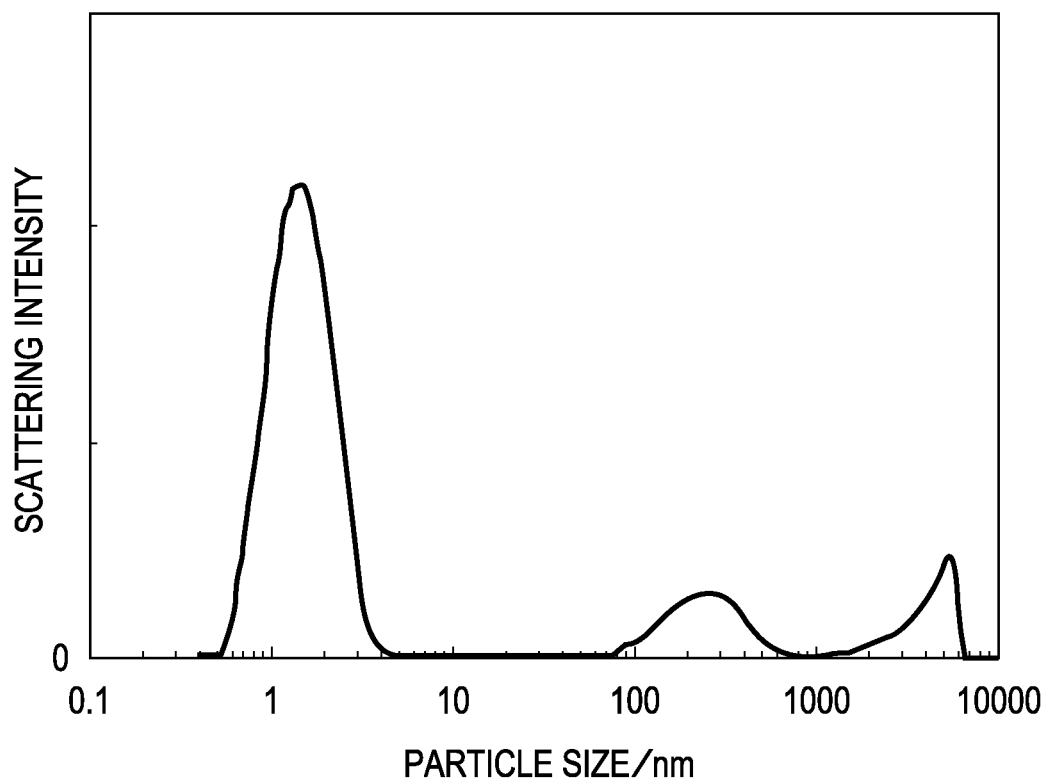
FIG. 8 is a particle size distribution curve of a precursor sol 1 of aluminum oxide in Comparative Example 1.
Figure 9:
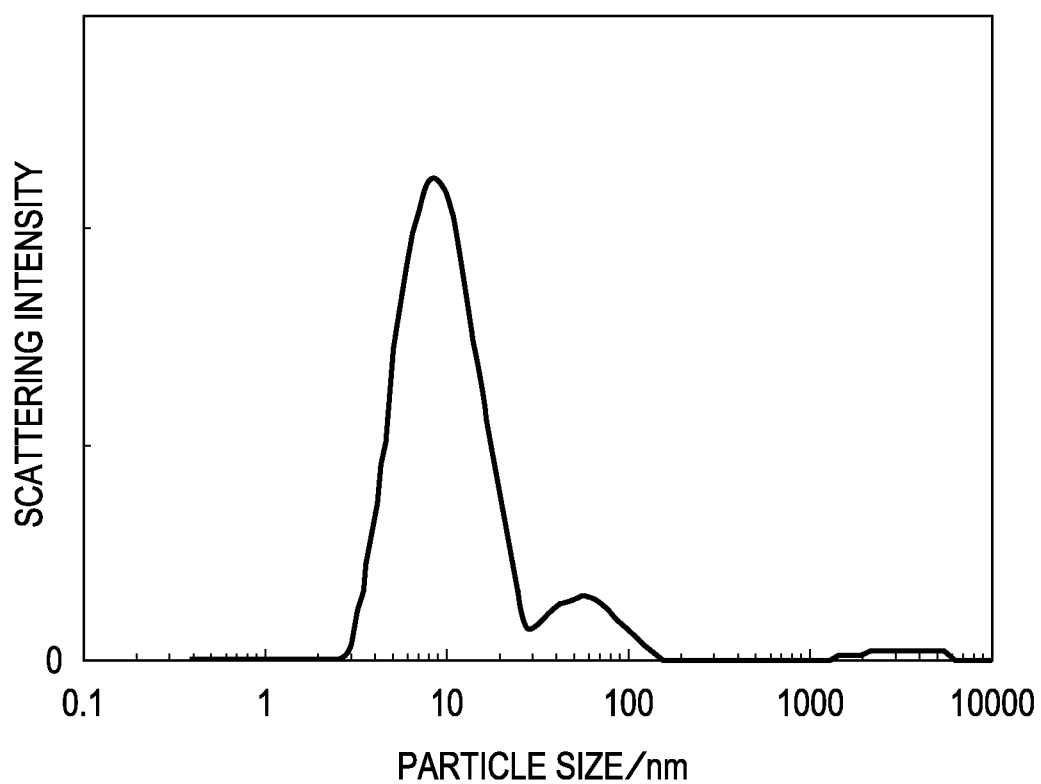
FIG. 9 is a particle size distribution curve of a precursor sol 7 of aluminum oxide in Comparative Example 3.

The precursor sols 1, 2, 7, and 12 of aluminum oxide were subjected to viscosity measurement and particle size distribution measurement. Table 1 shows the results. FIGS. 8 and 9 show particle size distribution curves of the precursor sols 1 and 7 of aluminum oxide in Comparative Examples 1 and 3. Regarding the sols 1, 2, and 7, FIGS. 10 to 12 are graphs showing the dependence of the viscosity, the average particle sizes of main peaks, and the percentages of areas of the main peaks on the molar equivalent of a catalyst solution (0.01 M dilute hydrochloric acid) with respect to aluminum sec-butoxide.

Comparative Example 5

The same operation was performed as in Example 5, except that the precursor sol 1 of aluminum oxide was used in place of the sol 3.

The results demonstrated that when the precursor sol 1 of aluminum oxide was spin-coated, streaks radiating out from the center of the substrate toward the periphery were observed. Furthermore, the results demonstrated that the difference in reflectivity after the immersion of the substrate in hot water was 0.2%, which showed in-plane nonuniformity in antireflection performance.

Comparative Example 6

The same operation was performed as in Example 5, except that the precursor sol 2 of aluminum oxide was used in place of the sol 3.

The results demonstrated that when the precursor sol 2 of aluminum oxide was spin-coated, a disadvantageous large star-shaped pattern was observed in the central portion of the substrate. Furthermore, the results demonstrated that the difference in reflectivity after the immersion of the substrate in hot water was 0.2%, which showed in-plane nonuniformity in antireflection performance.

Comparative Example 7

The same operation was performed as in Example 5, except that the precursor sol 7 of aluminum oxide was used in place of the sol 3.

The results demonstrated that when the precursor sol 7 of aluminum oxide was spin-coated, streaks radiating out from the center of the substrate toward the periphery were observed. Furthermore, the results demonstrated that the difference in reflectivity after the immersion of the substrate in hot water was 0.2%, which showed in-plane nonuniformity in antireflection performance.

Comparative Example 8

The same operation was performed as in Example 4, except that the precursor sol 12 of aluminum oxide was used in place of the sol 3.

The results demonstrated that when the precursor sol 12 of aluminum oxide was spin-coated, streaks radiating out from the center of the substrate toward the periphery and numerous cracks were observed. Furthermore, the results demonstrated that the difference in reflectivity after the immersion of the substrate in hot water was 0.2%, which showed in-plane nonuniformity in antireflection performance.

Comparative Example 9

The same operation was performed as in Example 7, except that the precursor sol 8 of aluminum oxide (with an average particle size of 1.7 nm and a peak area of 84%) was used.

FIG. 13 shows the results of the measurement of the reflectivity.

Comparative Example 10

The same operation was performed as in Example 7, except that the precursor sol 9 of aluminum oxide (with an average particle size of 2.2 nm and a peak area of 88%) was used.

FIG. 13 shows the results of the measurement of the reflectivity.

TABLE 1

| | Sol | Solvent | Amount of 0.01M dil. HCl (g) | Molar equivalent of 0.01M dil. HCl* | Viscosity (mPa · s) | Average particle size (nm) | Area of main peak* (%) |
|---|---|---|---|---|---|---|---|
| Example 1 | Precursor sol 3 of aluminum oxide | 4-Methyl-2-pentanol/1-ethoxy-2-propanol | 1.51 | 1.2 | 3.74 | 2.5 | 92 |
| Example 2 | Precursor sol 4 of aluminum oxide | 4-Methyl-2-pentanol/1-ethoxy-2-propanol | 1.64 | 1.3 | 3.73 | 3.1 | 95 |
| Example 3 | Precursor sol 5 of aluminum oxide | 4-Methyl-2-pentanol/1-ethoxy-2-propanol | 1.76 | 1.4 | 3.86 | 4.3 | 96 |
| Example 4 | Precursor sol 6 of aluminum oxide | 4-Methyl-2-pentanol/1-ethoxy-2-propanol | 1.89 | 1.5 | 4.01 | 6.2 | 98 |
| Comparative Example 1 | Precursor sol 1 of aluminum oxide | 4-Methyl-2-pentanol/1-ethoxy-2-propanol | 0.88 | 0.7 | 3.95 | 1.9 | 84 |
| Comparative Example 2 | Precursor sol 2 of aluminum oxide | 4-Methyl-2-pentanol/1-ethoxy-2-propanol | 1.26 | 1.0 | 3.84 | 2.1 | 89 |
| Comparative Example 3 | Precursor sol 7 of aluminum oxide | 4-Methyl-2-pentanol/1-ethoxy-2-propanol | 2.02 | 1.6 | 4.63 | 11.3 | 87 |
| Comparative Example 4 | Precursor sol 12 of aluminum oxide | 2-Propanol | 1.26 | 1.0 | 2.20 | 2.0 | 85 |

(Remark 1) * The catalyst solution (molar equivalent) indicates the molar equivalent of the catalyst solution with respect to aluminum sec-butoxide.

(Remark 2) * The area of the main peak indicates the proportion of the area of the peak assigned to particles having the average particle size shown in this table with respect to the total area of all peaks.

Evaluation of Performance

The results of Examples 1 to 4 demonstrated that the precursor sols 3 to 6 of aluminum oxide having specific particle sizes had low viscosities and contained reduced amounts of by-products. The results of Examples 5 to 8 demonstrated that the use of these precursor sols of aluminum oxide resulted in optical films having only small variations in reflectivity. The results of Examples 9 and 10 demonstrated that the resulting optical films had reduced reflectivities. In contrast, the results of Comparative Examples 5 to 8 demonstrated that the coatability of the precursor sols of aluminum oxide was poor and that the resulting optical films had large variations in reflectivity.

The Examples thus show that aspects of the present invention provide a precursor sol of aluminum oxide, in which the precursor sol does not easily aggregate in a liquid and has high stability as a coating material. Also, aspects of the present invention provide a method for producing an optical member with the precursor sol of aluminum oxide, the optical member having high antireflection performance and an antireflection coating with only small variations in reflectivity.

The optical member produced according to the present invention is usable on a transparent base with any refractive index, provides excellent antireflection effect on visible light, and has a long-term weather resistance. Thus, examples of a member for which the optical member according to the present invention can be used include various displays of word processors, computers, television sets, and plasma display panels; optical members, such as polarizer of liquid crystal displays, sunglass lenses, graduated eyeglass lenses, finder lenses for cameras, prisms, fly-eye lenses, toric lenses, various optical filters, and sensors formed of various optical glass materials and transparent plastics; imaging optical systems, observation optical systems such as binoculars, and projection optical systems for use in liquid crystal projectors using those optical members; various optical lenses of scan optical systems for use in laser printers; and optical members, such as covers of various instruments and window glasses of automobiles and electric trains.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-087241 filed Mar. 31, 2009, which is hereby incorporated by reference herein in its entirety.

What is claimed is:

1. A precursor sol of aluminum oxide, comprising:
   a solvent; and
   particles containing a hydrolysate of an aluminum compound and/or a condensate of the hydrolysate,
   wherein the particles have an average particle size of 2.5 nm to 7 nm, and
   wherein the solvent contains 50% by weight to 90% by weight of a monohydric alcohol having 5 to 8 carbon atoms and 10% by weight to 50% by weight of a water-miscible solvent having a boiling point of 110° C. to 170° C.

2. The precursor sol of aluminum oxide according to claim 1,
   wherein a particle size distribution curve of the particles includes at least one peak having a single peak top, and
   wherein the at least one peak has an average particle size of 2.5 nm to 7 nm, and
   the area of the peak having an average particle size of 2.5 nm to 7 nm is 90% or more of the total peak area of the particle size distribution curve.

3. The precursor sol of aluminum oxide according to claim 1, wherein the water-miscible solvent is glycol ether.

4. The precursor sol of aluminum oxide according to claim 1, wherein the particles are amorphous.

5. A method for producing an optical member, comprising the steps of:
   (1) feeding the precursor sol of aluminum oxide according to claim 1 onto at least one surface of a base;
   (2) spreading the precursor sol of aluminum oxide on the base;
   (3) drying and/or firing the base to form an aluminum oxide film; and
   (4) immersing the aluminum oxide film in hot water with a temperature of 60° C. to 100° C. to form a textured structure comprising aluminum oxide boehmite.

* * * * *